US010883521B2

(12) United States Patent
Jaśkiewicz et al.

(10) Patent No.: US 10,883,521 B2
(45) Date of Patent: Jan. 5, 2021

(54) SERVO VALVE

(71) Applicant: Hamilton Sundstrand Corporation, Charlotte, NC (US)

(72) Inventors: Zbigniew Jaśkiewicz, Wroclaw (PL); Lukasz Wiktorko, Wroclaw (PL)

(73) Assignee: UTC AEROSPACE SYSTEMS WROCLAW SP. Z O.O., Wroclaw (PL)

(*) Notice: Subject to any disclaimer, the term of this patent is extended or adjusted under 35 U.S.C. 154(b) by 0 days.

(21) Appl. No.: 16/229,104

(22) Filed: Dec. 21, 2018

(65) Prior Publication Data

US 2019/0195245 A1    Jun. 27, 2019

(30) Foreign Application Priority Data

Dec. 22, 2017    (EP) .................................... 17461650

(51) Int. Cl.
| | | |
|---|---|---|
| *F16K 31/02* | (2006.01) | |
| *F15B 13/043* | (2006.01) | |
| *F16K 31/06* | (2006.01) | |
| *F16F 9/46* | (2006.01) | |
| *F16K 31/08* | (2006.01) | |

(52) U.S. Cl.
CPC ...... *F15B 13/0433* (2013.01); *F15B 13/0435* (2013.01); *F15B 13/0438* (2013.01); *F16F 9/464* (2013.01); *F16K 31/0627* (2013.01); *F16K 31/08* (2013.01)

(58) Field of Classification Search
CPC .............. F15B 13/0433; F15B 13/0435; F15B 13/0438; F16F 9/464; F16K 31/0627; F16K 31/08

USPC .... 137/487.5, 596.14, 596.16, 625.6, 625.64
See application file for complete search history.

(56) References Cited

U.S. PATENT DOCUMENTS

| | | | | |
|---|---|---|---|---|
| 2,832,365 | A | * | 4/1958 | Smith ................. F15B 13/0438 137/82 |
| 2,977,985 | A | | 4/1961 | Ericson et al. |
| 3,139,109 | A | * | 6/1964 | Ruchser ................ F15B 20/001 137/596.16 |
| 3,200,845 | A | * | 8/1965 | Nakazima ........... F15B 13/0402 137/625.6 |

(Continued)

FOREIGN PATENT DOCUMENTS

| | | |
|---|---|---|
| CN | 101598150 A | 12/2009 |
| DE | 9115061 U1 | 5/1992 |
| JP | 2002106507 A | 4/2002 |

OTHER PUBLICATIONS

Extended European Search Report for International Application No. 17461650.8 dated Jun. 5, 2018, 7 pages.

*Primary Examiner* — Minh Q Le
(74) *Attorney, Agent, or Firm* — Cantor Colburn LLP

(57) ABSTRACT

A servo valve includes first and second nozzles spaced apart from each other, an elongate control member positioned between the nozzles, and a solenoid assembly surrounding at least a portion of the control member. The elongate control member has a first end and an opposing second end. The control member is configured to translate in response to the solenoid assembly being energised, such that the first end is moved towards the first nozzle and the second end is moved away from the second nozzle or the first end is moved away from the first nozzle and the second end is moved towards the second nozzle.

9 Claims, 4 Drawing Sheets

(56) References Cited

U.S. PATENT DOCUMENTS

| | | | | |
|---|---|---|---|---|
| 3,712,339 | A | * | 1/1973 | Bartholomaus ..... F15B 13/0438 137/625.62 |
| 3,804,120 | A | * | 4/1974 | Garnett ............... F15B 13/0433 137/625.64 |
| 3,996,956 | A | * | 12/1976 | Taft ....................... F15B 13/043 137/119.1 |
| 4,266,572 | A | * | 5/1981 | Schuttenberg ...... F15B 13/0402 137/625.63 |
| 4,319,609 | A | * | 3/1982 | Debrus ................. F15B 11/121 137/625.63 |
| 4,538,644 | A | * | 9/1985 | Knutson ............. F15B 13/0402 137/625.64 |
| 5,129,425 | A | * | 7/1992 | Howarth ............. F15B 13/0422 137/625.63 |
| 5,240,041 | A | * | 8/1993 | Garnjost ............... F15B 13/043 137/625.62 |
| 5,586,575 | A | * | 12/1996 | Bergamini .......... F15B 13/0438 137/488 |
| 5,586,627 | A | * | 12/1996 | Nezu ...................... B60G 17/08 188/266.6 |
| 5,697,401 | A | * | 12/1997 | Shinoda .............. F15B 13/0438 137/625.62 |
| 7,438,088 | B2 | * | 10/2008 | Matsumoto ......... F15B 13/0433 137/625.64 |
| 7,438,164 | B2 | | 10/2008 | Groves et al. |
| 7,637,281 | B2 | * | 12/2009 | Rapke ................. F15B 13/0402 137/625.64 |
| 2005/0279415 | A1 | | 12/2005 | Xu et al. |

* cited by examiner

SERVO VALVE

FOREIGN PRIORITY

This application claims priority to European Patent Application No. 17461650.8 filed Dec. 22, 2017, the entire contents of which is incorporated herein by reference.

TECHNICAL FIELD

This disclosure relates to a servo valve. This disclosure also relates to an actuator assembly and a method of controlling a servo valve.

BACKGROUND

Servo valves are well-known in the art and can be used to control the flow of hydraulic fluid to an actuator via a spool valve. Typically, a flapper is deflected by an armature connected to an electric motor away or towards nozzles, which control fluid flow to the spool valve. Deflection of the flapper can control the amount of fluid injected from the nozzles, and thus the amount of fluid communicated to the actuator via the spool valve. In this way, servo valves can allow precise control of actuator movement.

SUMMARY

From one aspect, the present disclosure relates to a servo valve.

Moving the control member/first end toward the first nozzle may fully, or partially, close the first nozzle, and moving the control member/second end away from the second nozzle may fully, or partially, open the second nozzle.

The first and second nozzles may be in fluid communication with a spool, such that opening/closing the nozzles may vary the position of the spool, which in turn may vary the position of a hydraulic actuator in fluid communication with the spool.

In an embodiment of the above servo valve, the control member extends along a longitudinal axis, the first and second nozzles are spaced apart along the longitudinal axis, and the control member is configured to translate along the longitudinal axis. The first and second nozzles and the control member may be aligned along the longitudinal axis and may be co-axial with each other.

In a further embodiment of either of the above servo valves, a first fluid flow path is defined between the first nozzle and the first end and a second fluid flow path is defined between the second nozzle and the second end. The solenoid assembly is configured to translate the control member between a first position in which the first fluid flow path is restricted or closed by the first end and the second fluid flow path is open, and a second position, in which the first fluid flow path is open and the second fluid flow path is restricted or closed by the second end. The solenoid assembly may also be configured such that, when it is un-energised, the control member moves to a third position, in which the first and second fluid flow paths are open. The third position is an intermediate, neutral position.

In a further embodiment of the above servo valve, the servo valve further comprises a control member biasing member is configured to oppose translation of the control member to the first and second positions from the third position. In an embodiment, the control member biasing member may surround at least a portion of the control member (16), positioned between the solenoid assembly (14) and one of the first or second ends (17a, 17b) of the control member (16).

In a further embodiment of the above servo valve, one of the first and second ends includes a stop extending radially outward from the control member, and the control member biasing member is retained between the stop and the solenoid assembly.

In a further embodiment of the above servo valve, the servo valve further comprises a servo valve housing. The servo valve housing includes first and second nozzle cavities housing the first and second nozzles respectively, a solenoid cavity housing the solenoid assembly, and a control member cavity passing through the housing between one of the nozzle cavities and the solenoid cavity. The control member extends through the control member cavity. The control member may contact and be supported by an inner surface of the control member cavity. The stop is disposed in the solenoid cavity, and may be in contact with and supported by the inner surface of the solenoid cavity.

In a further embodiment of any of the above servo valves, the solenoid assembly further comprises a coil surrounding at least a portion of the control member, and a ferromagnetic member connected to and extending radially outward from the control member concentric with the coil. The term "connected to", should be understood to cover the ferromagnetic member being a separate component attached to the control member by a suitable attachment means or being formed integrally, as part of the control member. The ferromagnetic member may even be an axial portion of the control member itself.

In an additional embodiment of the above servo valve, the solenoid assembly further comprises a coil retainer at an opposing second outer edge of the coil. The coil retainer surrounds at least a portion of the control member, and extends radially inward towards the control member, such that the coil retainer retains the coil in its axial position relative to the control member. The coil retainer is configured to interact with the ferromagnetic member to limit the amount translation of the control member to the first or second position.

In a further embodiment of any of the above servo valves, the first and second ends comprise a planar surface facing the respective nozzle for engaging a nozzle outlet opening in the respective nozzle.

In a further embodiment of any of the above servo valves, the first nozzle is in fluid communication with a first portion of a spool. The second nozzle is in fluid communication with a second portion of the spool. The servo valve housing may further include a spool cavity housing the spool. The spool has a central spool axis. The first and second portions of the spool are opposite axial ends of the spool, and the spool is configured to translate axially along the spool axis in response to a fluid bias being placed on the spool between the first and second portions of the spool. The servo valve also further comprises a pair of opposing spool biasing members in contact with the first and second portions of the spool respectively, wherein the biasing members are configured to oppose axial translation of the spool along the central spool axis.

In a further embodiment of the above servo valve, the servo valve further comprises a supply port, a return port, and first and second control ports. The supply port is upstream of the first and second nozzle cavities in fluid communication with the first and second fluid flow paths via the first and second portions of the spool and via respective first and second inlet orifices. The return port is downstream of the nozzle cavities in fluid communication with the first and second fluid flow paths and the spool. The first and second control ports are for providing fluid communication between the spool and a hydraulic actuator.

From another aspect, the present disclosure relates to an actuator assembly having the servo valve according to the above described aspect or any embodiment thereof, and a hydraulic actuator in fluid communication with the servo vale and controlled thereby.

From another aspect, the present disclosure relates to an actuator assembly.

From yet another aspect, the present disclosure relates to a method of controlling a servo valve.

In an embodiment of the above method, the elongated control member comprises a first end and an opposing second end, and the translating further comprises moving the first end towards the first nozzle and the second end away from the second nozzle or moving the first end away from the first nozzle and the second end towards the second nozzle.

BRIEF DESCRIPTION OF DRAWINGS

Some exemplary embodiments of the present disclosure will now be described by way of example only, and with reference to the following drawings in which.

DETAILED DESCRIPTION

Figure 1:
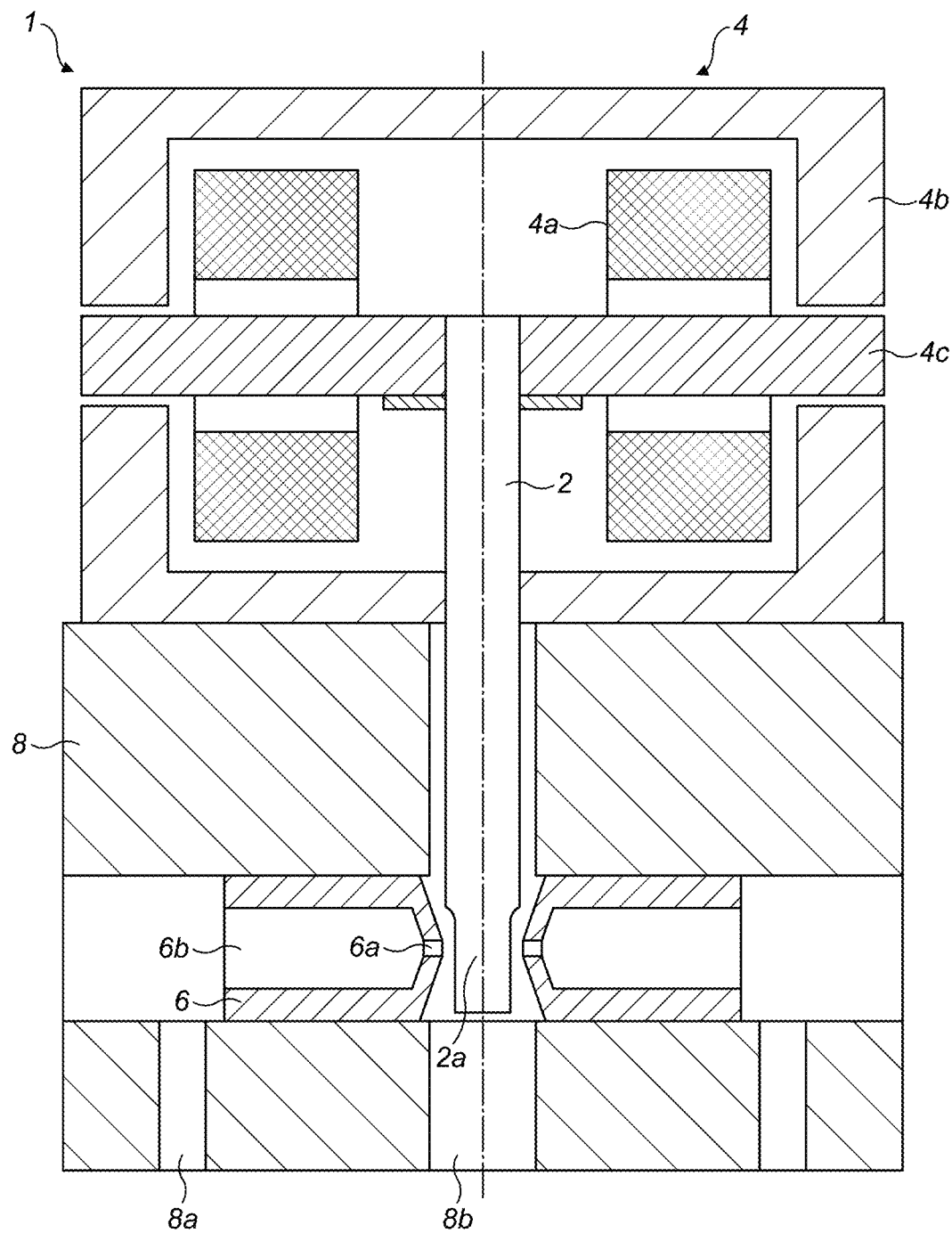
FIG. 1 shows an example of a prior art servo valve.

With reference to FIG. 1, a prior art servo valve 1 is illustrated. Servo valve 1 comprises an electric motor 4, flapper 2, nozzles 6 and nozzle housing 8. The electric motor 4 comprises coils 4a, permanent magnets 4b and armature 4c. The coils 4a are in electrical communication with an electrical supply (not shown) and when activated, interact with the permanent magnets 4b to create movement of armature 4c, as is well-known in the art. Flapper 2 is attached to armature 4c and is deflected by movement of the armature 4c. Nozzles 6 are housed within nozzle housing 8 via an interference fit and comprise a fluid outlet 6a and fluid inlet 6b. Housing 8 also has a port 8a, which allows communication of fluid to the nozzles 6. The flapper 2 comprises a blocking element 2a at an end thereof which interacts with fluid outlets 6a of nozzles 6 to provide metering of fluid from the fluid outlets 6a to a fluid port 8b in the housing 8, which allows communication of metered fluid from the nozzles 6 to an actuator via a spool valve input (not shown). As is known in the art, the electric motor 4 is used to control deflection of the blocking element 2a and vary the fluid delivered to the actuator from nozzles 6, as required.

Figure 2:
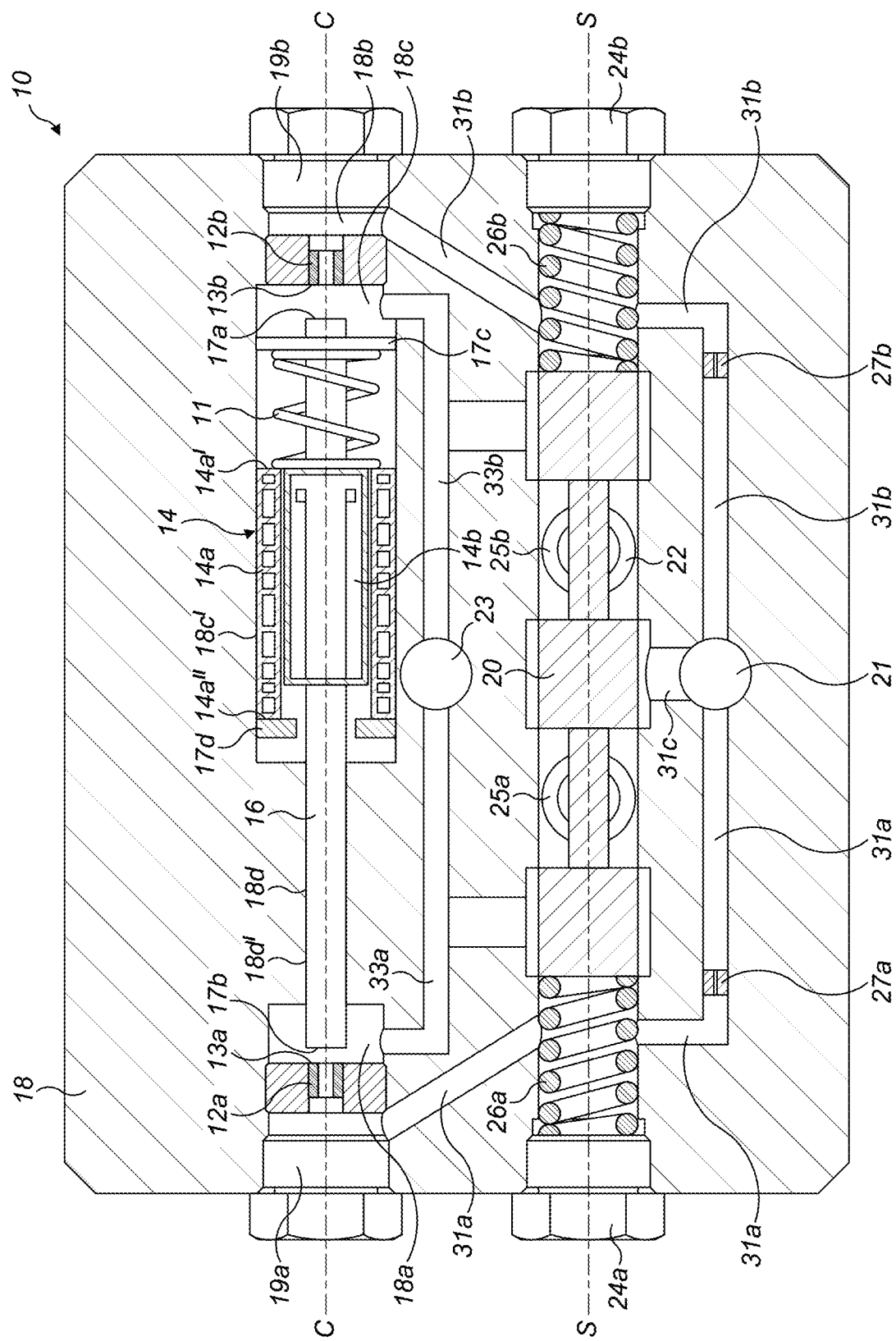
FIG. 2 shows a cross-sectional view of an embodiment of a servo valve in accordance with this disclosure.

With reference to FIG. 2, a servo valve 10 is illustrated, in accordance with an embodiment of the present disclosure. Servo valve 10 comprises a pair of opposed nozzles 12a, 12b, a solenoid assembly 14, a control member, in this embodiment a rod 16, a control rod biasing member 11, and a servo valve housing 18.

The nozzles 12a, 12b are axially spaced apart and aligned along a common central nozzle axis C. Each nozzle 12a, 12b has an outlet opening 13a, 13b centred on the central nozzle axis C. The control rod 16 is co-axial with the central nozzle axis C and positioned between the nozzle outlet openings 13a, 13b. The control rod 16 has a first end 17a and a second, opposing end 17b that are used (in the same way as the blocking element 2a of FIG. 1) to interact with the nozzle outlet openings 13a, 13b, as will be discussed in more detail below.

Figure 3A:
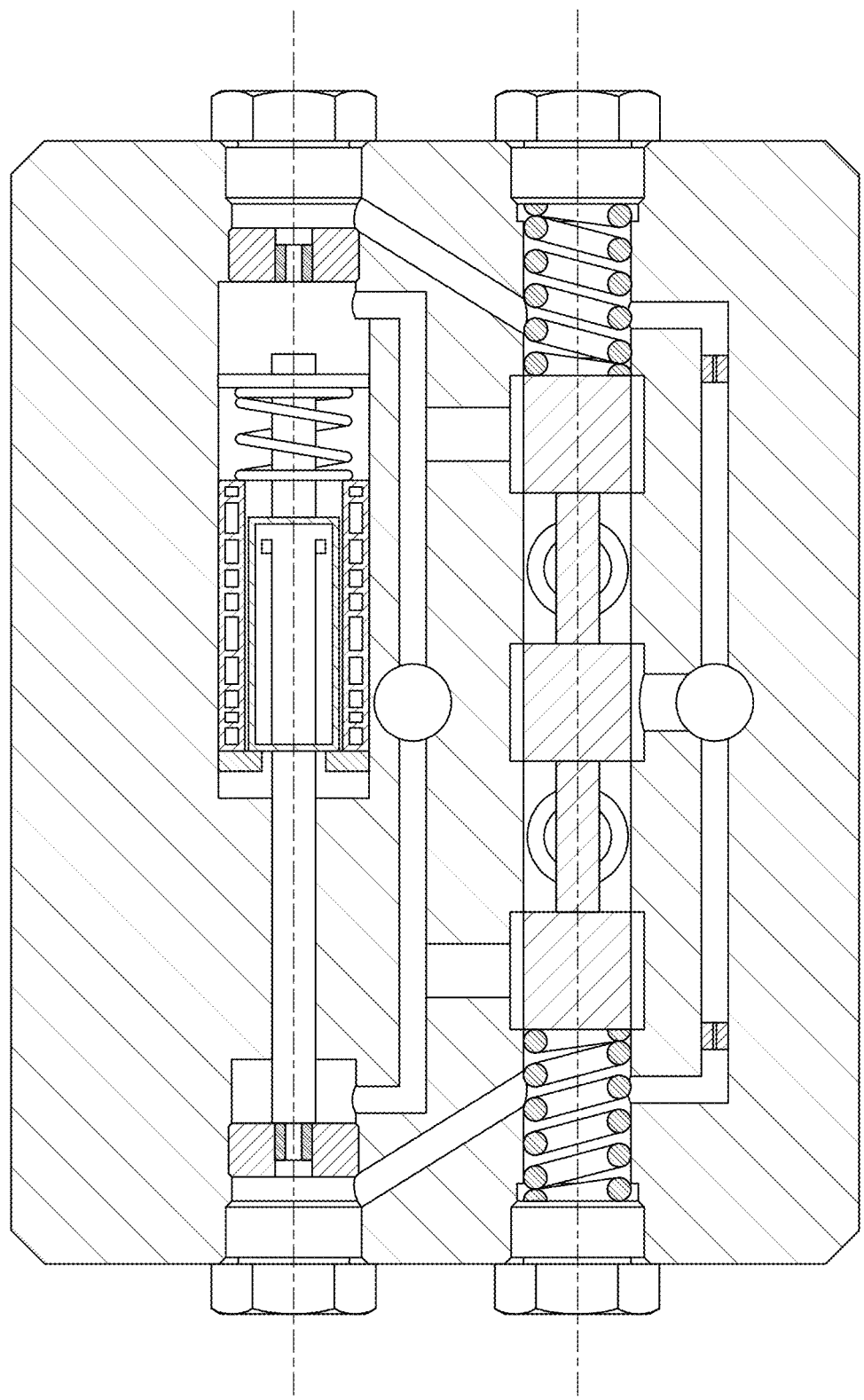
FIGS. 3a and 3b show cross-sectional views of different positions of the control member in the servo valve of FIG. 2.
Figure 3B:
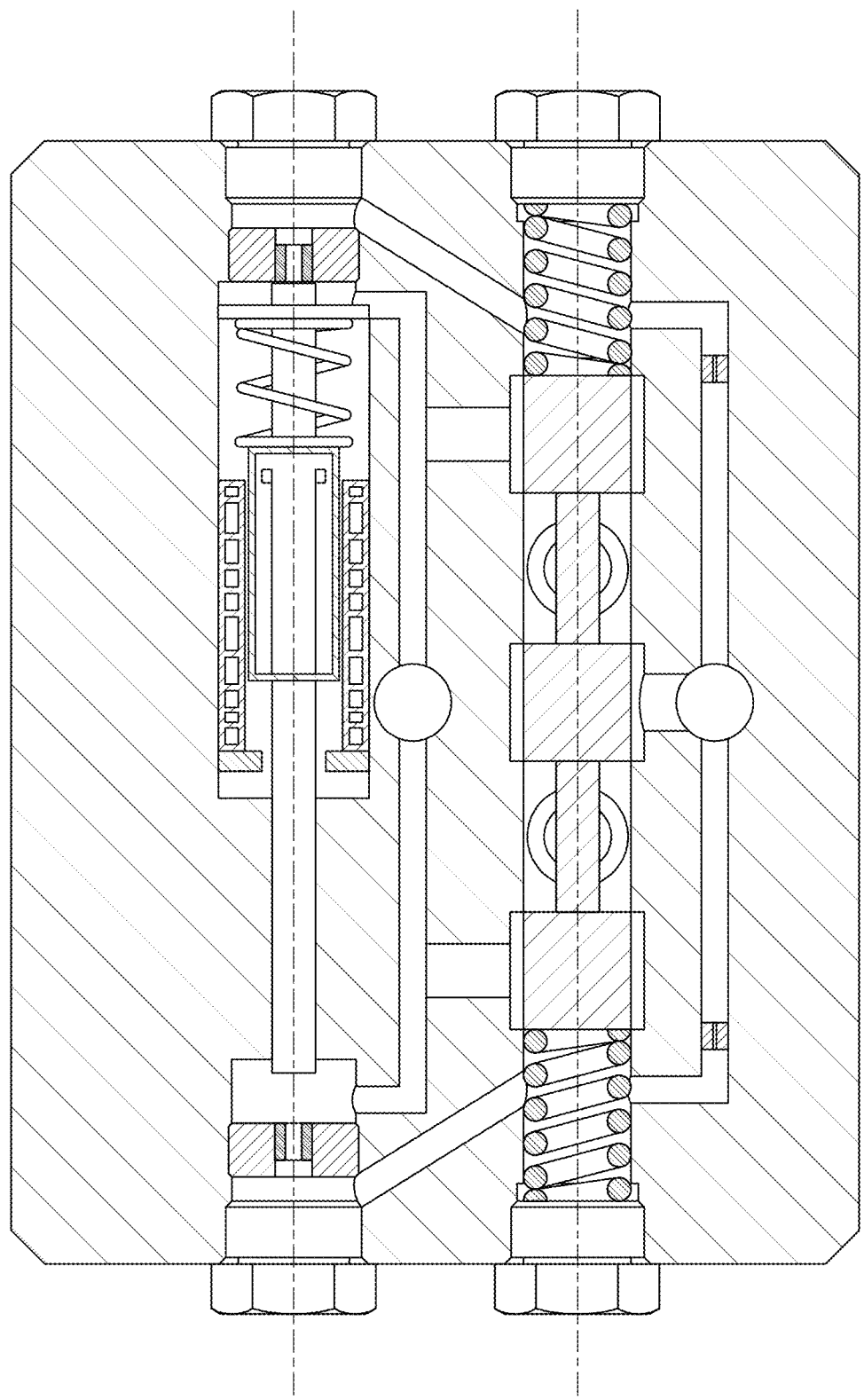

The solenoid assembly 14 surrounds at least a portion of the control rod 16, and is configured to translate the control rod 16 axially along the central nozzle axis C in response to the solenoid assembly being energised. Specifically, in the depicted embodiment, solenoid assembly 14 comprises a coil 14a concentric with the central nozzle axis C and surrounding at least a portion of the control rod 16, and a ferromagnetic member 14b connected to and extending radially outward from the control rod 16 concentric with the coil 14a. Ferromagnetic member 14b is at least partially surrounded by the coil 14a. Ferromagnetic member 14b can either be attached to the control rod 16 by a suitable attachment means or formed integrally, as part of the control rod 16. Ferromagnetic member 14b is formed of any suitable ferromagnetic material, for instance, an iron alloy, such as steel or AlNiCo. Thus, energisation of the coil 14a will cause the ferromagnetic member 14b to experience an electromagnetic force along the axial direction of the coil 14a, which in this case is along the central nozzle axis C. In this manner, energisation of the coil 14a allows axial translation of the ferromagnetic material 14b and the control rod 16 along the central nozzle axis C. As will be understood by the skilled person, the degree of axial translation can be adjusted by varying the amount of voltage/current used to energise the coil 14a, and the direction of axial translation can be adjusted by changing the polarity of the voltage/current used to energise the coil 14a. For instance, a positive polarity can be used to move the control rod 16 and the ferromagnetic member 14b in one direction, such as to the "left-hand" side, as shown in FIG. 3A, and a negative polarity can be used to move the control rod 16 and the ferromagnetic member 14b in the opposite direction, such as to the "right-hand" side, as shown in FIG. 3B, or vice versa. In this manner, solenoid assembly 14 can be used to adjust the axial distance between the first end 17a and the nozzle outlet opening 13a, and between the second end 17b and the nozzle outlet opening 13b, in order to control the fluid injected to the spool valve assembly (discussed in more detail below) and actuator (not shown) downstream of the nozzles 12a, 12b. To control fluid injection accurately, the first and second ends 17a, 17b may be planar (i.e. flat) in a plane perpendicular to the central nozzle axis C.

Servo valve housing 18 comprises a pair of opposed nozzle cavities 18a, 18b, a solenoid cavity 18c and a control rod cavity 18d passing through the housing 18 between the nozzle cavity 18a and the solenoid cavity 18c. Each nozzle cavity 18a, 18b houses a respective nozzle 12a, 12b. The solenoid cavity 18c houses the solenoid assembly 14, with the coil 14a being fixedly attached to the internal surface 18c' defined by the solenoid cavity 18c. The control rod 16 extends axially between the first nozzle cavity 18a and the solenoid cavity 18c and passes through the control rod cavity 18d. The control rod 16 makes contact with the internal surface 18d' defined by the control rod cavity 18d and is thus supported by the control rod cavity 18d, which helps keep the axial translation of the control rod 16 parallel to and co-axial with the central nozzle axis C. This may provide more accurate control of fluid injection from the nozzles 12a, 12b. Of course, alternative support mechanism, e.g. bearings, may be used within the scope of this disclosure, which do not require direct contact between the control rod 16 and the cavity surface 18*d'*.

Control rod 16 further comprises a stop 17*c* at the first end 17*a* that extends radially outward from the control rod 16 relative to the central nozzle axis C, and contacts the inner surface 18*c'* of the solenoid cavity 18*c*. In a similar manner to the control rod 16, contact with the inner surface 18*c'* helps support the control rod 16 within the servo valve housing 18, and helps keep the axial translation of the control rod 16 parallel to and co-axial with the central nozzle axis C.

The control rod biasing member 11 surrounds at least a portion of the control rod 16, and is positioned between the solenoid assembly 14 and the first end 17*a* of the control rod 16. The control rod biasing member 11 is configured to provide a biasing force that opposes the axial translation of the control rod 16. Biasing member 11 may be a spring that acts to oppose the axial translation of the control rod 16 in both tension and compression. In the depicted embodiment, the control rod biasing member 11 is retained between the stop 17*c* and the solenoid assembly 14, specifically, a first axially outer edge 14*a'* of the coil 14*a*. In this manner, when the solenoid assembly 14 is de-energised after a translation event, the control rod biasing member 11 will return the control rod 16 to a central "neutral" position (i.e. axially centred relative to the central nozzle axis C), in which the first end 17*a* and second end 17*b* are equal distances from a respective one of the nozzle outlet openings 13*a*, 13*b*. The opposing force of the control rod biasing member 11 may also be used to meter the axial translation of the control rod 16, to provide more accurate control of the control rod 16 positioning.

The solenoid assembly 14 further comprises a coil retainer 17*d* at a second, axially outer edge 14*a''* of the coil 14*a* opposite the first axially outer edge 14*a'*. The coil retainer 17*d* surrounds at least a portion of the control rod 16, and is concentric therewith. The coil retainer 17*d* is fixedly attached to the internal surface 18*c'* and extends radially inward towards the control rod 16 relative to the central nozzle axis C. In this manner, the retainer 17*d* is used to retain the coil 14*a* in its axial position, and is configured to interact with the radially outwardly extending ferromagnetic member 14*b* to limit the amount of axial translation of the control rod 16, in the "left-hand" direction according to FIG. 2, and such as shown in FIG. 3A. Although only one retainer 17*d* is depicted, within the scope of this disclosure, further retainers could be used in the solenoid cavity 18*c* to interact with the ferromagnetic member 14*b* and restrict control rod 16 translation in the opposite axial direction (i.e. in the "right-hand" direction according to FIG. 2). Retainers avoid the need to rely only on the force of biasing member 11 and/or restricting the degree of solenoid assembly 14 energisation to limit axial translation of the control rod 16.

Nozzle cavities 18*a*, 18*b* are bored through the servo valve housing 18 from the exterior of the housing 18. Caps 19*a*, 19*b* are used to hermetically seal the cavities 18*a*, 18*b* from the exterior of the servo valve housing 18. In preferable embodiments, the caps 19*a*, 19*b* are removable, such that the nozzle cavities 18*a*, 18*b* can be accessed easily for maintenance purposes. For instance, caps 19*a*, 19*b* may be in screw threaded engagement with the servo valve housing 18.

Servo valve 10 further comprises a spool valve assembly. Spool valve assembly includes a spool 20 having a central spool axis S. Servo valve housing 18 houses the spool 20 in a spool cavity 22 that is in fluid communication with the nozzle outlet openings 13*a*, 13*b*. Spool 20 is configured to translate axially along the spool axis S, within the spool cavity 22, in response to a fluid bias being placed on the spool 20 from fluid being communicated from the nozzle outlet openings 13*a*, 13*b*.

In the same manner as the nozzle cavities 18*a*, 18*b*, spool cavity 22 is also bored from the exterior of the housing 18, and a second pair of caps 24*a*, 24*b* are used to hermetically seal opposing ends of the spool cavity 22 from the exterior of the servo valve housing 18. Caps 24*a*, 24*b* may also be removable, for instance, by being in screw threaded engagement with the servo valve housing 18.

A pair of opposing spool biasing members 26*a*, 26*b* are housed in the spool cavity 22, and each biasing member 26*a*, 26*b* is disposed and retained between a respective outer axial end of the spool 20 and caps 24*a*, 24*b*. The spool biasing members 26*a*, 26*b* are configured to bias the spool 20 to a central "neutral" axial position in the spool cavity 22 relative to the spool axis S. In this manner, biasing members 26*a*, 26*b* resist axial translation of the spool 20 from the central "neutral" position. Servo valve 10 further comprises a supply port 21 for supplying fluid to the nozzle outlets 13*a*, 13*b* from a fluid supply (not shown), a return port 23 for returning fluid from the nozzle outlet openings 13*a*, 13*b* back to the fluid supply, and first and second control ports 25*a*, 25*b* for delivering fluid from the spool cavity 22 to an actuator (not shown).

The supply port 21 is fluidly connected to the nozzle outlets 13*a*, 13*b* by respective channels 31*a*, 31*b*, that extend through the servo valve housing 18. Channels 31*a*, 31*b* pass through the spool cavity 22 between the outer axial ends of the spool 20 and the caps 24*a*, 24*b*. A third channel 31*c* also allows fluid to be directly communicated from the supply port 21 to the spool cavity 22, without passing through the nozzles 12*a*, 12*b*. Metering orifices 27*a*, 27*b* are placed in the channels 31*a*, 31*b* to aid metering of fluid to the nozzles 12*a*, 12*b*. The return port 23 is fluidly connected to the nozzle outlet openings 13*a*, 13*b* by respective channels 33*a*, 33*b*, which also each extend from the nozzle cavities 18*a*, 18*b* to the spool cavity 22, allowing fluid communication thereto from the nozzle outlet openings 13*a*, 13*b*.

As will be understood by the skilled person, by adjusting the axial positioning of the control rod 16 by selectively energising the solenoid assembly 14, the level of fluid pressure communicated to the spool cavity 22 can be controlled. This, in turn, controls the axial positioning of the spool 20 in the spool cavity 22, which controls the amount of fluid pressure communicated to the actuator via the control ports 25*a*, 25*b*. In this manner, a relatively small movement of the control rod 16 caused by energisation of the solenoid assembly 14 can produce a highly amplified movement of the actuator.

It is to be appreciated that by replacing the electric motor 4 and flapper 2 of the prior art with the control rod 16 and solenoid assembly 14 of this disclosure, a much more compact "pilot stage" of a servo valve can be realised, which reduces weight and complexity. Such reductions in weight are particularly advantageous in aerospace applications. In addition, the use of a solenoid assembly 14 to control the control rod 16 to adjust fluid injection from the nozzles 12*a*, 12*b* may allow for a more sensitive servo valve 10 that can make finer, and more accurate adjustments than an assembly controlled by an electric motor 4 and flapper 2 system.

The invention claimed is:
1. A servo valve comprising:
first and second nozzles spaced apart from each other;
an elongate control member for controlling fluid flow through the first and second nozzles, the control mem- ber being positioned between the nozzles and having a first end and an opposing second end; and a solenoid assembly surrounding at least a portion of the control member, and configured to translate the control member in response to the solenoid assembly being energised, such that the first end is moved towards the first nozzle and the second end is moved away from the second nozzle; wherein:

a first fluid flow path is defined between the first nozzle and the first end;

a second fluid flow path is defined between the second nozzle and the second end;

the solenoid assembly is configured to translate the control member between a first position, in which the first fluid flow path is restricted or closed by the first end and the second fluid flow path is open, and a second position, in which the first fluid flow path is open and the second fluid flow path is restricted or closed by the second end; and the solenoid assembly is configured such that, when it is un-energised, the control member moves to a third position, in which the first and second fluid flow paths are open, and the servo valve further comprises:

a control member biasing member configured to oppose translation of the control member to the first and second positions from the third position, wherein one of the first and second ends includes a stop extending radially outward from the control member, and the control member biasing member is retained between the stop and the solenoid assembly;

wherein the solenoid assembly further comprises:

a coil surrounding at least a portion of the control member; and a ferromagnetic member connected to and extending radially outward from the control member concentric with the coil, wherein the control member biasing member is retained between the stop and a first axially outer edge of the coil.

2. The servo valve of claim 1, wherein the control member extends along a longitudinal axis, the first and second nozzles are spaced apart along the longitudinal axis, and the control member is configured to translate along the longitudinal axis.

3. The servo valve of claim 2, wherein the first and second nozzles and the control member are aligned along the longitudinal axis.

4. The servo valve of claim 1, further comprising a servo valve housing including:

first and second nozzle cavities housing the first and second nozzles respectively;

a solenoid cavity housing the solenoid assembly;

a control member cavity passing through the housing between one of the nozzle cavities and the solenoid cavity, wherein the control member extends through the control member cavity, and the stop is disposed in the solenoid cavity.

5. The servo valve of claim 1, wherein the first and second ends comprise a planar surface facing the respective nozzle for engaging a nozzle outlet opening of the respective nozzle.

6. The servo valve of claim 1, wherein the first nozzle is in fluid communication with a first portion of a spool, the second nozzle is in fluid communication with a second portion of the spool, the spool has a central spool axis, the first and second portions of the spool are opposite axial ends of the spool, and the spool is configured to translate axially along the spool axis in response to a fluid bias being placed on the spool between the first and second portions of the spool, and the servo valve further comprises a pair of opposing spool biasing members in contact with the first and second portions of the spool respectively, wherein the biasing members are configured to oppose axial translation of the spool along the central spool axis.

7. The servo valve of claim 6, further comprising:

a supply port upstream of the first and second nozzle cavities in fluid communication with the first and second fluid flow paths via the first and second portions of the spool and via respective first and second inlet orifices;

a return port downstream of the nozzle cavities in fluid communication with the first and second fluid flow paths and the spool; and first and second control ports for providing fluid communication between the spool and a hydraulic actuator.

8. An actuator assembly comprising:

the servo valve of claim 7; and a hydraulic actuator in fluid communication with the first and second control ports.

9. A method of controlling a servo valve comprising first and second nozzles in fluid communication with first and second portions of a spool, the method comprising:

controlling fluid flow through first and second nozzles by translating an elongate control member between the first and second opposed nozzles, wherein the step of translating the control member comprises energising a solenoid assembly in operative connection with the control member;

wherein the elongated control member comprises a first end and an opposing second end, and the translating further comprises:

moving the first end towards the first nozzle and the second end away from the second nozzle; and the servo valve further comprises:

a control member biasing member configured to oppose translation of the control member between the first and second nozzles, wherein one of the first and second ends includes a stop extending radially outward from the control member, and the control member biasing member is retained between the stop and the solenoid assembly;

wherein the solenoid assembly further comprises:

a coil surrounding at least a portion of the control member; and a ferromagnetic member connected to and extending radially outward from the control member concentric with the coil, wherein the control member biasing member is retained between the stop and a first axially outer edge of the coil.

* * * * *